United States Patent [19]

Wilson

[11] 4,254,676
[45] Mar. 10, 1981

[54] WORKHOLDING
[75] Inventor: Bernard Wilson, Eastleigh, England
[73] Assignee: Pratt Burnerd International Limited, Halifax, England
[21] Appl. No.: 953,297
[22] Filed: Oct. 20, 1978
[30] Foreign Application Priority Data
Oct. 29, 1977 [GB] United Kingdom ............... 45124/77
[51] Int. Cl.³ .................. B23B 3/36; B23B 19/02; G01L 3/00; B23B 39/00
[52] U.S. Cl. ................. 82/34 R; 82/28 R; 73/133 R; 279/1 R; 279/110; 408/7; 408/12
[58] Field of Search ............... 82/34 R, 1, 1 C, 28 R; 279/2, 110, 1 R; 408/16, 12, 7; 269/23, 321 R, 285; 73/133 R, 760, 141 R

[56] References Cited
U.S. PATENT DOCUMENTS

| | | | |
|---|---|---|---|
| 1,637,676 | 8/1927 | Bohuszewicz | 82/34 R |
| 2,228,902 | 1/1941 | Allen | 82/34 R |
| 2,971,417 | 2/1961 | Chlebus | 269/23 |
| 3,153,960 | 10/1964 | Allport | 82/1 R |
| 3,469,475 | 9/1969 | Watt | 408/16 |
| 3,618,270 | 11/1971 | Koide | 82/28 R |
| 3,652,099 | 3/1972 | Bilz | 408/16 |
| 3,659,864 | 5/1972 | Blattry | 279/110 |
| 3,744,353 | 7/1973 | Rohs | 82/28 R |
| 3,759,092 | 9/1973 | Fishel | 73/141 R |
| 3,830,509 | 8/1974 | Weber | 279/2 |
| 3,909,020 | 9/1975 | Yamano | 279/110 |
| 3,936,060 | 2/1976 | Hiraa | 279/1 R |

FOREIGN PATENT DOCUMENTS

| | | | |
|---|---|---|---|
| 1189491 | 4/1970 | United Kingdom | 73/133 R |
| 436250 | 10/1974 | U.S.S.R. | 73/133 R |

*Primary Examiner*—Harrison L. Hinson
*Attorney, Agent, or Firm*—John C. Smith, Jr.

[57] ABSTRACT

The invention relates to work holding and is concerned with the provision of a work holding device which is more efficient than known devices. According to the invention a work holding device comprises a device for gripping a workpiece, the device being provided with internal detection means for determining the value of a force between the device and the workpiece. The value of the force can be displayed for the benefit of a user of the device. It can also be used for control purposes.

20 Claims, 4 Drawing Figures

WORKHOLDING

BACKGROUND TO THE INVENTION

The invention relates to workholding.

DESCRIPTION OF THE PRIOR ART

Work holding devices are known such as chucks, but with known devices, it is impossible for a user of a chuck to know exactly what the gripping force is when a workpiece is being gripped. It is possible to calculate what the gripping force should be under normal conditions, working from the power that is applied to the chuck, e.g. hydraulic power, but a number of factors can make such calculations inaccurate or ineffective. For instance if the mechanism of a chuck becomes severely worn or lacks lubrication and therefore becomes difficult to move, it may be providing substantially less gripping force at the jaws than it would if new or well maintained, although the power applied to the chuck will be the same. It is also possible to measure gripping force by means of external measuring devices gripped in the jaws but this can only be done prior to actually using the chuck to grip a workpiece.

It is also known in the work holding field to utilise a concept known as adaptive control, in which the way in which a workpiece and a tool engage one another is controlled in dependence upon the forces acting between them. Up to now however, adaptive control has been carried out by sensing forces on the tool, and adjusting the position of the tool accordingly.

A problem exists with modern chucks which are rotated at very high speeds. These chucks normally have a set of jaws which are urged radially inwardly with respect to the axis of rotation, in order to grip a workpiece. At very high speeds, centrifugal force tends to move the jaws radially outwardly and the workpiece is loosened to an unsafe degree. Conventional chucks therefore often have to be over-tightened when the workpiece is first inserted in the chuck, to allow for some slackening at very high speeds. In some cases this is not practical because the strength of the chuck's component parts would not allow it. In some cases also, the workpiece is such that it will be damaged by the over-tightening, for example it might be a hollow member which would be crushed, or at least slightly distorted. Such workpieces cannot be machined at high speeds using conventional chucks.

OBJECTS OF THE INVENTION

It is an object of the invention to provide a work holding device in which the force with which the device grips a workpiece can be measured directly from within the chuck.

It is a further object of the invention to provide a work holding device which is particularly suitable for use in adaptive control.

It is a still further object of the invention to provide a work holding device which enables workpieces to be machined at high rotational speeds with less risk that the workpiece will either be insecurely clamped or be damaged by the forces used to grip the workpiece.

SUMMARY OF THE INVENTION

The invention provides a work holding device comprising a device for gripping a workpiece, the device being provided with detection means for determining the value of a force between the device and the workpiece.

The detection means may include means for displaying the value of the force, for example for the benefit of the user of the device, but it is preferred that alternatively or in addition, means are provided for utilising the value of the force for control purposes. For example there may be means for utilising the value of the force to adjust the pressure with which the workpiece is gripped.

Alternatively or in addition, there may be means for utilising the value of the force to control a tool which is acting on the workpiece.

The gripping device may have one or more jaws, at least one jaw being provided with a sensing device which senses the force between the jaw and a workpiece which the jaw engages against.

The sensing device may sense the force directly.

Alternatively the sensing device may sense a parameter which is dependent on the force.

The sensing device may comprise a transducer, for example in the form of a strain gauge.

The sensing device may be arranged to transmit signals to a control device.

The gripping device may comprise a rotatable device such as a chuck, the control device being stationary, in which case the signals may comprise electrical signals which are transmitted to the control device by means of slip rings.

Alternative means for transmitting the signals may utilise signal waves, for example radio waves, audio waves, or ultrasonic waves.

Where the gripping device is rotatable, there may be means to utilise the value of the force to control the rotational speed of a workpiece gripped by the device.

The invention includes a method of workholding comprising the use of a gripping device to grip a workpiece, and detecting the value of a force acting between the gripping device and the workpiece. The value of the force may be utilised for display and/or control purposes.

Further objects and advantageous features of the invention will become apparent from the following description of specific embodiments of the invention.

DESCRIPTION OF EMBODIMENTS OF THE INVENTION

The invention is particularly suitable for use with rotational workholding devices such as chucks, and will therefore be described with specific reference thereto. However, as mentioned below, the invention may have other applications.

Figure 1:
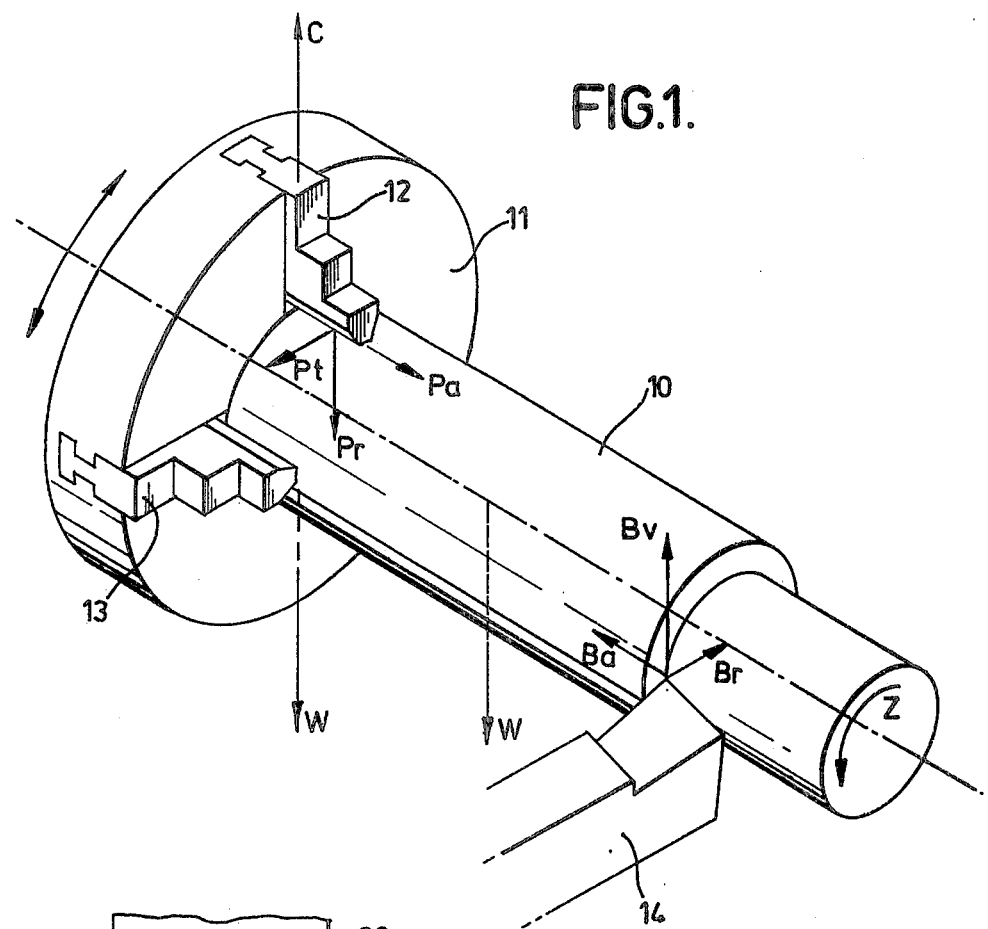
FIG. 1 is a diagrammatic perspective view of a workpiece being gripped in a workholding device, in the form of a chuck, the workpiece being acted upon by a cutting tool.

FIG. 1 illustrates a typical workholding situation, in which a workpiece 10 is gripped in a chuck, the chuck having a body 11 and three jaws, two of which are visible at 12 and 13. A cutting tool 14, moving axially along the workpiece, is being used to reduce the diameter of the workpiece by a machining process.

In addition to gravitational forces W, forces are exerted upon the workpiece 10 by the cutting tool 14. Because of the rotation of the workpiece in the direction of arrow Z, the tool exerts a tangential force Bv on the workpiece 10. Since the tool is also traversing the length of the workpiece, it exerts an axial force Ba. The tool also exerts a reaction force on the workpiece in the radial direction, Br.

The forces exerted by the tool are resisted by the jaws of the chuck, which in turn apply additional forces to the other end of the workpiece. Assuming that the end of the workpiece is not butting against the chuck body, there will be a force in the axial direction Pa resisting the force Ba. There are also forces Pt in a tangential direction and forces Pr in the radial direction.

The radial forces Pr, which are exerted by each of the three jaws, apply gripping pressure to the workpiece and tend to hold the workpiece stable. The tangential forces Pt, which are dependent on the co-efficient of friction between the workpiece and the jaws, tend to resist the twisting effect, about the longitudinal axis of the workpiece, which is brought about by the tangential force Bv.

The radial gripping forces Pr exerted by the jaws of the chuck are very important. When a delicate workpiece is being utilised, such as a thin walled tube, it is important that the forces Pr are not too great, since they can crush and damage the workpiece. On the other hand the forces must be sufficiently great to hold the workpiece securely in spite of the forces exerted on the workpiece by the cutting tool 14.

Modern chucks are operating at higher and higher rotational speeds, and test results have shown positively that the effect of centrifugal force on chuck jaws can have a serious effect on gripping force. In FIG. 1 the chuck jaw 12 will be subject to a centrifugal force C, and the other jaws will be subjected to similar force.

Figure 2:
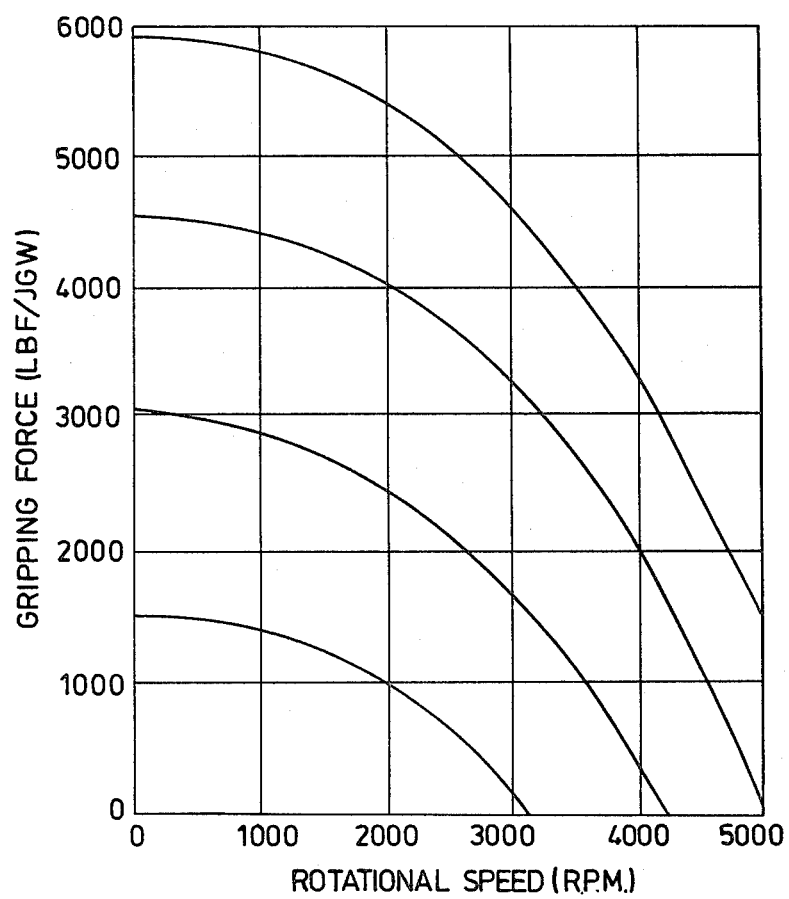
FIG. 2 is a graph illustrating the way in which the gripping force of a rotational workholding device can vary with the rotational speed of the device for different input forces.

FIG. 2 is a graph of actual test results showing the progressive reduction in gripping force with increasing rotational speed on one particular size of typical chuck. It will be seen that whatever the initial gripping force, there is only a small percentage reduction up to speeds of about 2000 r.p.m., but after that the rate at which gripping force reduces increases rapidly. Thus it will be seen, for example, that with an initial gripping force of about 4500 lbs force per jaw, there will nevertheless be virtually no gripping force left whatsoever at a rotational speed of 5000 r.p.m.

Until now, it has been impossible for the user of a chuck to know exactly what the jaw gripping force is during the machining process. It has only been possible, except by using external gripmeters, to calculate the gripping force, working from the power which is applied to the chuck, for example hydraulic or electrical power. However a number of factors can make such calculations inaccurate or ineffective. For example, if the mechanism of a chuck becomes severely worn or lacks lubrication and therefore becomes difficult to move, it may be providing substantially less gripping force at the jaws than it would if new or well maintained, although the power applied to the chuck will be the same.

Figure 3:
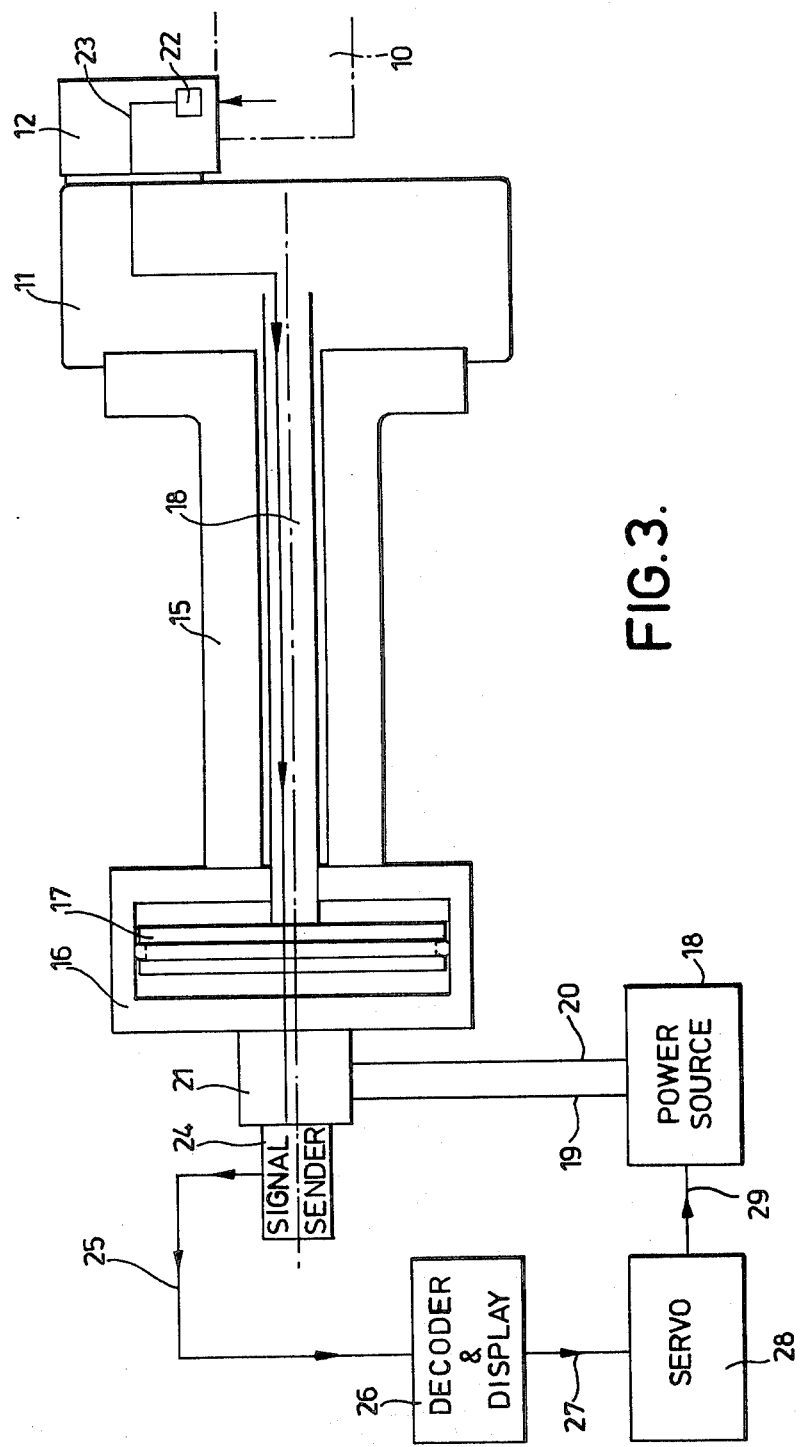
FIG. 3 illustrates diagrammatically one embodiment of workholding device according to the invention.

Turning now to the embodiment of workholding device according to the invention shown in FIG. 3, there is shown a device having a chuck body 11 and three gripping jaws, only one, 12, being shown for the sake of simplicity. A workpiece 10 is gripped between the jaws.

The work holding device is attached to a hollow spindle 15 which extends through the body of a machine tool (not shown) to which the device is fitted, and at the rear of the spindle there is an operating cylinder 16 containing an operating piston 17. The piston 17 controls a piston rod 18 which extends through the hollow spindle 15 and operates a jaw control mechanism for moving the jaws. The details of the cylinder 16, piston 17, and the way in which they move the jaws are conventional and will not be described further. Hydraulic fluid for operating the chuck is supplied from a stationary power source 18 via two control lines 19 and 20, each control line being in communication respectively with one side of the piston 17, via a conventional rotating seal device 21. Other means of actuating the work holding device such as pneumatically or electrically would be equally applicable.

The jaw 12 is provided with a transducer 22 adjacent to its gripping face, which transducer is sensitive to the radial force Pr. Wires 23 pass from the transducer through the chuck body, through the hollow spindle 15 and cylinder 16, to a slip ring device 24 from which signals from the transducer can be transmitted by wiring 25 to a stationary de-coding and display device 26. The device 26 is arranged to de-code the signals from the transducer and display the actual radial gripping force on a visual monitor. This has the advantage that a user of the device need not rely on the indicated power supplied to the chuck to calculate the gripping force. He has a visual display of the force which is actually measured at the jaw by the transducer and the accuracy of the device will not be significantly affected by such variable factors as friction in the mechanism, for example due to lack of maintenance and loss of gripping force at speed will also be indicated. This gives an element of improved safe operation of the device.

However the device shown in FIG. 3 has another important application related to the problems of high rotational speeds and also adaptive control. Signals related to the gripping force of the jaws are transmitted from the device 26 via wiring 27 to a servo mechanism 28. The servo mechanism 28 provides a feed back 29 to the power source 18 and will probably involve microprocessor and computor control.

Thus if for example the power source is initially actuated by an operator of the machine to give a desired gripping force of say 3000 lbs force per jaw, at zero revolutions, then if this force begins to reduce as a result of the speed at which the chuck is driven during use, the drop in force will be detected by the transducer which will cause the servo 28 to act on the power source 18 and increase the power supplied, to return the gripping force to the desired level, or if this is not practical to shut down the machine or sound a warning.

It will thus be seen that the device shown in FIG. 3 firstly gives the operator an accurate indication of the actual gripping force to which the workpiece is subjected, and secondly makes it possible to ensure that a substantially constant gripping force is obtained, irrespective of the speed of rotation of the chuck.

Not only does the device shown in FIG. 3 enable the more effective carrying out of existing operations, but it also makes it possible to carry out certain operations which are not possible on conventional chucks. As will be appreciated from FIG. 2, if one is using a conventional chuck in which the gripping force varies with rotational speed, it is impossible to machine at a speed of say 4000 r.p.m., a workpiece which is too delicate to withstand a gripping force of more than say 3000 lbs force per jaw. If such a workpiece is initially gripped with a force of 3000 lbs per jaw or less, then at 4000 r.p.m. there will not be sufficient gripping force remaining to secure the workpiece in the chuck. If a higher initial force is used on the other hand, the workpiece will be crushed. With the embodiment shown in FIG. 3, there is no significant variation in gripping force as speed increases, and so the maximum suitable gripping force for a particular workpiece can be selected initially, and this gripping force will be substantially maintained once the chuck is put into rotation, even if the rotation takes place at high speed.

It is not essential for the transducer 22 to be positioned at the gripping face of the jaw 12, and the transducer may be positioned at any point in the chuck where the transducer will be subjected to a force which is equal to or dependent according to some predetermined law upon the gripping force of the jaw.

When the invention is applied to a chuck having different sets of interchangeable jaws, for use in different gripping applications, the position of the transducer as shown in FIG. 3 may be inconvenient in some circumstances. Firstly it would mean that one jaw of each set of jaws had to be provided with a transducer, and secondly it would be necessary to provide some form of electrical interconnection which would have to be disconnected when a jaw was removed, and reconnected when a new jaw was fitted.

Figure 4:
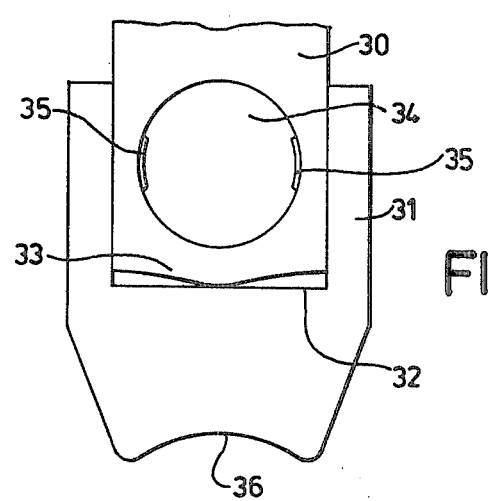
FIG. 4 is an end view of one jaw of an alternative embodiment of gripping device according to the invention.

FIG. 4 is an end view of part of a jaw which is more suitable when interchangeability is required. The jaw comprises a jaw body 30, which is permanently connected to the chuck body 11, the movement of the jaw body 30 being controlled by the piston rod 18 via the chuck mechanism. Each jaw body has a set of interchangeable shoes, one shoe 31 being shown in FIG. 4. The shoe 31 fits over the jaw body 30 and has a flat face 32 which abuts against a projection 33 of the jaw body 30. A hole 34 is formed in the jaw body 30 and a set of strain gauges 35 are secured to the peripheral wall of the hole. When the gripping face 36 of the shoe 31 is subjected to gripping force, pressure is exerted on the projection 33 and the hole 34 deforms. This deformation is detected by the strain gauges 35, which provide the necessary signals.

With jaws as shown in FIG. 4, there is no need for more than one detecting device, arranged in one jaw body 30, and there is no need to make any electrical connections or disconnections when changing from one gripping application to another. It is only necessary to remove one set of shoes 31, and replace them with a different set.

The invention is not restricted to the features of the foregoing embodiments. For instance the principles applicable to the device shown in FIG. 3 are equally applicable to a chuck utilising a power source which is not hydraulic. The power source may be pneumatic or the chuck might for example be operated by an electrical motor, or other electrical device, in which case a servo mechanism 28 could be provided to transmit electrical feed back to the electrical power source to ensure that the chuck provided a substantially constant gripping force.

It is not essential that signals be transmitted to the decoder and display device 26 via slip ring arrangement 24. It may be possible to transmit signals from a moving part of the device to a stationary part of the device utilising signal waves, for example radio waves, audio waves, or ultrasonic waves.

The invention can be used with advantage on chucks other than high speed chucks. For example in the arrangement shown in FIG. 2, the servo 28 providing feed back could be dispensed with, but the decoder and display device 26 is still of considerable use in giving a user of the device an accurate indication of the actual gripping force which is initially applied to the jaws before the chuck is put into rotation. Alternatively a simple display device may be utilised without a decoder, e.g. to display a parameter related to gripping force.

It may be possible to provide detecting means in the chuck which are sensitive to forces other than the radial forces Pr. For example as an alternative or an addition to the means of control illustrated in FIG. 3, it may be possible to detect the force Pt, which is related to the force Bv exerted by the tool 14 which tends to twist the workpiece in the jaws, and utilise this information to control movements of the tool 14 to optimise cutting torque or other parameters. For instance if there is a significant increase in the force Pt, showing an increased resistance to cutting for some reason, the tool 14 may be arranged to back off slightly or the spindle speed may be adjusted until the force is returned to an acceptable level.

To provide increased sensitivity, the slip ring device 24 may be provided with silver brushes.

The sensing of the gripping force of the jaws and workholder may be put to other uses than those described above. For example for some applications it may be desired to vary the gripping force in a controlled manner, instead of maintaining the gripping force substantially constant. For instance the feed back could be used to effect a desired change in gripping force for changing cutting conditions during a cycle. When changing from rough cutting to light or finish cutting for example, it may be possible and desirable to reduce the gripping force, thereby reducing unnecessary workpiece distortion.

A microprocesser or computer may be used for control purposes. For example the decoder and display device 26 may comprise an appropriately programmed microprocesser.

Although the invention has been described with particular reference to rotatable workholding devices such as chucks, the invention may also have useful applications in connection with stationary workholding devices.

I claim:

1. A work holding device in combination with a tool to act on a workpiece and comprising a chuck for gripping said workpiece, said chuck having at least one gripping face for engaging said workpiece, detection means for determining the value of a desired force between said gripping face and said workpiece, said detection means comprising a sensing device positioned in the region of said gripping face to sense directly forces applied to said gripping face by said workpiece and control means to control said tool depending upon the value of said desired force detected by said detection means.

2. A work holding device as claimed in claim 1 further comprising means for displaying a numerical value of said desired force for the benefit of the user of said device.

3. A work holding device as claimed in claim 1 in which said chuck has a plurality of jaws, each having a gripping face, at least one of said jaws being provided with a sensing device in the region of its gripping face.

4. A work holding device as claimed in claim 3 in which said sensing device is adapted to directly sense said desired force.

5. A work holding device as claimed in claim 3 in which said sensing device is adapted to directly sense a parameter which is dependent on said desired force.

6. A work holding device as claimed in claim 3 in which said sensing device is a transducer.

7. A work holding device as claimed in claim 6 in which said transducer is a strain gauge.

8. A work holding device as claimed in claim 1 further comprising transmission means for transmitting signals from said sensing device to said control means.

9. A work holding device comprising a rotatable device for gripping a workpiece, detection means for determining the value of a force between said device and said workpiece and means responsive to said detection means for controlling the rotational speed of said gripping device depending upon the force detected by said detection means.

10. A work holding device comprising a rotatable chuck, at least one jaw in said chuck for gripping a workpiece, said at least one jaw being provided with a sensing device for sensing the value of the force between said at least one jaw and a workpiece engaged by said jaw, a stationary control device and transmission means comprising slip rings for transmitting electrical signals from said sensing device to said control device.

11. A work holding device comprising a rotatable chuck, at least one jaw in said chuck for gripping a workpiece, said at least one jaw being provided with a sensing device for sensing the value of the force between said at least one jaw and a workpiece engaged by said jaw, a stationary control device and transmission means comprising means for transmitting signal waves from said sensing device to said control device.

12. A work holding device as claimed in claim 11 in which the signal waves are selected from the group consisting of radio waves, audio waves and ultrasonic waves.

13. A work holding device comprising a chuck, means for rotating said chuck, said chuck having a plurality of jaws, each said jaw having a gripping face for engaging said workpiece, detection means for determining the value of a desired force between said gripping face and said workpiece, said detection means comprising a sensing device positioned in the region of said gripping face of at least one of said jaws to sense directly forces applied to said gripping face by said workpiece, a stationary control device and transmission means including at least one slip ring for transmitting electrical signals from said sensing device to said stationary control device.

14. A work holding device comprising a chuck, means for rotating said chuck, said chuck having a plurality of jaws, each said jaw having a gripping face for engaging said workpiece, detection means for determining the value of a desired force between said gripping face and said workpiece, said detection means comprising a sensing device positioned in the region of said gripping face of at least one of said jaws to sense directly forces applied to said gripping face by said workpiece, a stationary control device and transmission means for transmitting signal waves from said sensing device to said control device.

15. A work holding device as claimed in claim 14 wherein said signal waves are selected from the group consisting of radio waves, audio waves and ultrasonic waves.

16. A work holding device comprising a chuck for gripping a workpiece, means for rotating said chuck, said chuck having at least one gripping face for engaging said workpiece, detection means for determining the value of a desired force between said gripping face and said workpiece, said detection means comprising a sensing device positioned in the region of said gripping face to sense directly forces applied to said gripping face by said workpiece and means to control the rotational speed of said chuck depending upon the value of said desired force detected by said detection means.

17. A work holding device comprising a rotatable chuck for gripping a workpiece, means for rotating said chuck, said chuck having at least one gripping face for engaging said workpiece, detection means for determining the value of a desired force between said gripping face and said workpiece, said detection means comprising a sensing device positioned in the region of said gripping face to sense directly forces applied to said gripping face by said workpiece, and control means adapted to be actuated in dependence upon variations in the detected force brought about by variations in the rotational speed of the chuck.

18. A work holding device as claimed in claim 17 in which said control means comprises means for adjusting the pressure with which said workpiece is gripped by said chuck to compensate for the effect of centrifugal force.

19. A work holding device as claimed in claim 17 in which said control means comprises means for terminating rotation of said chuck when said sensing device senses a predetermined reduction in the force applied to said gripping face by said workpiece.

20. A work holding device as claimed in claim 17 in which said control means comprises means for actuating a warning device when said sensing device senses a predetermined reduction in the force applied to said gripping face by said workpiece.

* * * * *